Patented Oct. 24, 1922.

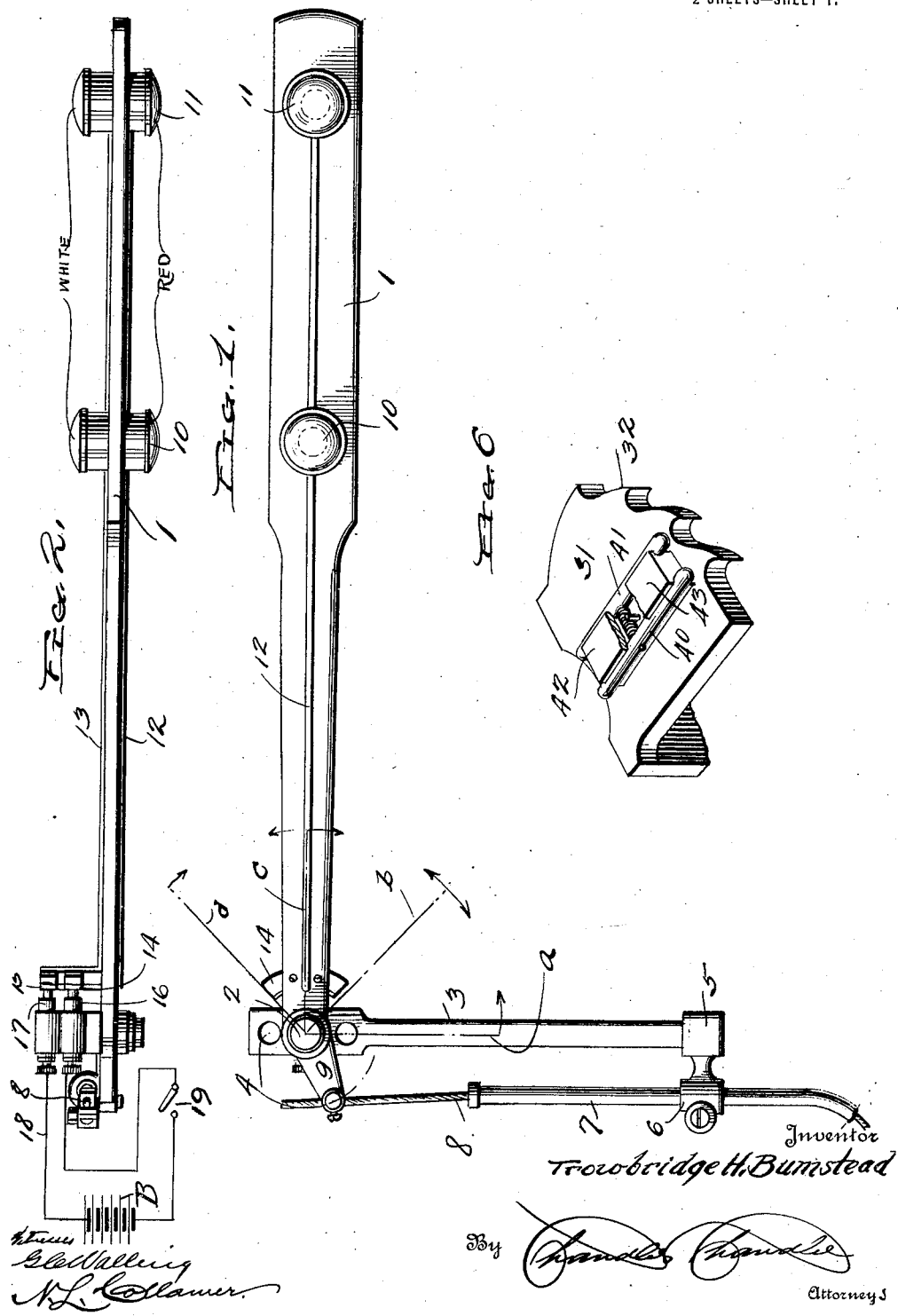

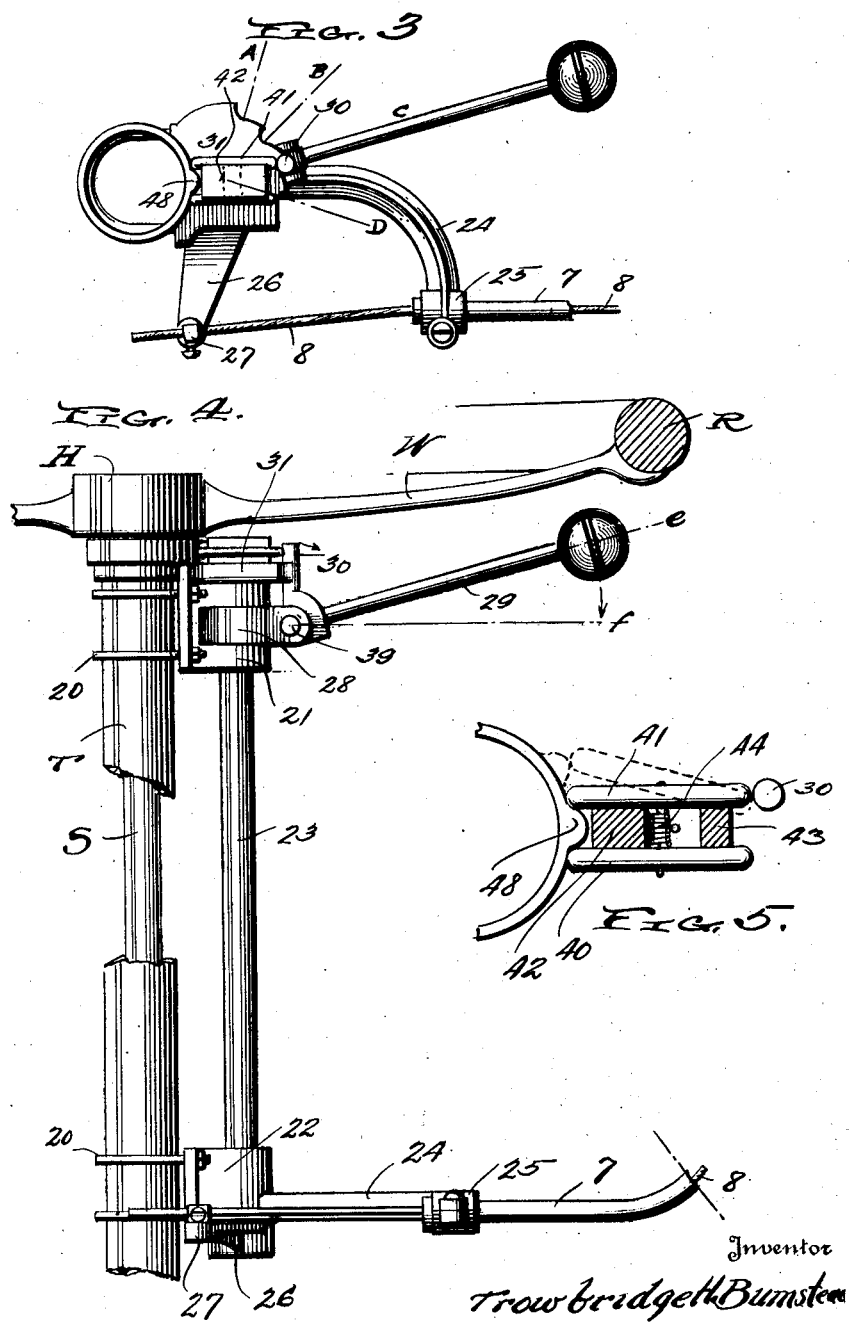

1,433,119

UNITED STATES PATENT OFFICE.

TROWBRIDGE H. BUMSTEAD, OF ONTARIO, CALIFORNIA.

SEMIAUTOMATIC MOTOR-VEHICLE WARNING SIGNAL.

Application filed March 18, 1920. Serial No. 366,858.

*To all whom it may concern:*

Be it known that I, TROWBRIDGE H. BUMSTEAD, a citizen of the United States, residing at Ontario, in the county of San Bernardino, State of California, have invented certain new and useful Improvements in Semiautomatic Motor-Vehicle Warning Signals; and I do hereby declare the following to be a full, clear, and exact description of the invention, such as will enable others skilled in the art to which it appertains, to make and use the same.

This invention relates to automobile signals, and it comprises improvements in the signal proper, the controller for setting the signal, the means for latching the controller and therefore holding the signal set, and the means for tripping the latch automatically or by hand.

One object of the invention is to provide a semaphore signal with means for setting it in various radial positions around its pivot or permitting it to hang therefrom, to respectively indicate the intentions of the driver or to place the semaphore at neutral when it is out of use.

Another object is to provide two or more lights arranged in a line along the semaphore and illuminated at night, so as to indicate at a distance the angle at which the signal arm is set, and to provide means whereby these lights are automatically extinguished when the signal arm falls to neutral.

Another object of the invention is to provide an improved manually operated control whereby the signal may be set by the driver without removing his hands from the steering wheel, and may be as easily latched in position or unlatched and permitted to return automatically to neutral.

Another object of the invention is to provide means for tripping the latch automatically when the driver straightens out his course after having made a turn, so that in case he should fail to change the signal from its warning position after the need for the warning has passed, the semaphore would be automatically restored to neutral as he proceeded on his way.

Details of one successful manner of constructing the several elements of this invention are set forth below and shown in the drawings wherein:

Figure 1 is an elevation and Figure 2 a plan view of the signal and its support.

Figure 3 is a plan view and Figure 4 an elevation of the controller, the former view also well illustrating the latch mechanism and Figure 4 showing in dotted lines the working connection between it and the signal operating mechanism of Figure 1.

Figure 5 is a plan view and Figure 6 a perspective detail of the trip mechanism.

The signal proper is a semaphore 1, constituting preferably the long signal arm of a lever which is mounted on a horizontal pivot 2 at the upper end of a support 3 adapted to be attached to the side of the car or by preference to one edge of the windshield by fastening means such as bolts or screws engaging holes 4 in the support. The lower end of the latter carries a bumper 5 against which the semaphore strikes when it falls to neutral position indicated by the line $a$, and attached to the support by a clamp 6 is an upright guide tube 7 through which leads the operating cord or wire 8, the same being connected with the short arm 9 of the lever whose long arm constitutes the semaphore. The latter is preferably painted a bright color so that it may be readily distinguished in the day time or at dusk, especially when it is projected outward from the car or windshield as seen in Figure 1. For the purposes of this specification let us assume that when the semaphore stands along the line $b$ it indicates that the driver is about to slow down or stop; when it stands along the line $c$ as shown in this view, it indicates his intention to turn to the left; and when it is raised to the line $d$ it gives warning that he is about to turn to the right. It is obvious that tension imparted to the wire 8 will set the semaphore in three of these positions, but when tension is relaxed the arm 1 will fall by gravity to an upright position $a$ and come against the bumper 5, and this we may call the "neutral" position where the arm will hang quite near the machine and be comparatively inconspicuous.

For use after dark the arm 1 is provided with two or more lamps 10 and 11 disposed in a line along its length, the same preferably being bulbs located within lamp boxes having red glasses at the rear and white glasses at the front. These lamps are connected in series by wires 12 and 13 leading respectively to contact plates 14 and 15 carried rigidly by the arm and struck on arcs around the center of the pivot 2, and spring pressed brushes 16 and 17 are adapted respectively to contact with these plates, these brushes being disposed in a circuit 18 through a battery B or other source of electric energy and a switch 19 so that when the latter is closed, the lamps may be illuminated. The length of the arcuate plates is such, however, that when the semaphore falls to its neutral position they move out of contact with the brushes so that the circuit is broken and the lights are extinguished—thereby economizing electricity and avoiding the possibility that any signal will be displayed. When the semaphore stands horizontal, the two lamps 10 and 11 are relatively horizontal whether viewed from the front or rear, and as they can be seen from both directions, their difference in color will indicate whether the machine carrying them is approaching or receding. This is also true of the signal with the semaphore in either position b or d. In the former, the observer will see the right hand lamp 11 lower than the left hand lamp 10, but in the position d the lamp 11 will be higher than 10. Obviously this relative position has one meaning if the machine is approaching and the reverse meaning if it is receding, and this accounts for the preferred use of glasses of different color in the front and rear of the lamp boxes, although the colors named are only suggestive. In the day time the current is entirely cut off by opening the switch 19.

We are concerned only with the steering mechanism of the motor vehicle, and in Figure 4 is diagrammatically shown the steering rod or shaft S passing up through the steering post or tube T and secured to the hub H of the steering wheel W, and for purposes of illustration we have shown a portion of the rim R of this wheel. Secured by clips 20 embracing the tube T are upper and lower bearings 21 and 22 for the controller shaft 23. Projecting from the lower bearing 22 is a bracket 24 carrying a clamp 25 within which is fastened one extremity of the guide tube 7 above mentioned, and the dotted lines connecting Figures 1 and 4 indicate that this tube may be given a bend between the points where it is connected to the clamps 6 and 25, and yet the operating cord or wire 8 which is flexible will move around said bend as will be clear. Of course this detail might be replaced by other means for connecting the semaphore operating mechanism of Figure 1 with the controller of Figure 4 such as gearing or the well known bell-crank levers used in bell hanging, without departing from the spirit of my invention. Projecting radially from the lower end of the controller shaft is a crank arm 26 to whose outer end is pivoted a clip 27 within which the wire 8 is engaged, and therefore the oscillation of the shaft 23 will draw on said wire or relax the tension thereon according to the direction in which the arm 26 is swung. The upper bearing 21 is preferably split as seen in Figure 4, and between its upper and lower sections a block 28 is mounted fast on the shaft 23, said block carrying a handle 29 extending out beneath the steering wheel to within reach of the finger of the operator's right hand when they engage the rim R.

As thus far described, swinging of the lever or handle 29 beneath the steering wheel and in a substantially horizontal plane will cause the simultaneous movement of the semaphore in a substantially vertical plane, and in Figure 3 radial lines A, B, C, and D have been drawn to indicate positions of the latter corresponding with positions of the semaphore bearing relatively the same letters. However, the weight of the semaphore arm 1 will automatically move it to neutral and automatically move the handle 29 to its neutral position which is along the line A, unless some locking or latching means is employed. Accordingly I make the handle one arm of a bell-crank lever pivoted at 39 in the block 28, its other arm rising from the pivot and constituting a pawl 30; and fast on the upper section of the bearing 21 is a ratchet plate 31 whose teeth 32 have their active faces dished slightly so that in effect they become hooks capable of holding the pawl 30 with sufficient friction to prevent the fall of the handle or other arm 29 under its weight. In other words, when the handle is depressed from the plane e in Figure 4 toward or into the plane f, the pawl is disengaged from the ratchet and the handle can swing free in either direction. When the operator has brought it to the proper line (and the lines A, B, C, D, of Figure 3 intersect the several teeth), he raises the outer end of the handle with his finger tip and engages the pawl with the proper tooth whose shape holds it there after he has removed his finger and his hand. It will be clear, however, that slight pressure on the handle tending to depress it or on the pawl tending to move it out of engagement with its tooth, will trip this latching mechanism so that the handle drops to the plane f, whereupon the weight of the semaphore will swing the handle to the line A, and all parts will automatically assume their neutral or inactive positions.

In Figures 5 and 6 is shown an automatic trip mechanism which may be described as follows: Two pins 40 and 41 are loosely mounted in grooves along the sides of blocks 42 and 43 which may well rise rigidly from the ratchet plate 31, and between said blocks these pins are connected by a contractile spring 44 tending to draw them inward and to hold them within said grooves. The rear ends of these pins lie relatively in points just forward of those teeth 32 which correspond with the lines C and D, as seen in Figure 3. On the hub H of the steering wheel is a cam 48 standing normally between the front ends of the pins, and the cam and the pins are preferably rounded as seen in Figure 5. As the wheel is turned in the ordinary movements of steering, the cam swings one pin or the other out a little from the block 42 as the spring 44 permits, and no further effect is produced, but if the hub is turned so far that the cam passes beyond the front end of either pin as seen in dotted lines in Figure 5, a result does follow which will be explained below.

With the above construction of parts, let us assume that the operator intends to turn to the left at the next corner, and desires to so signal his intention. As the handle 29 will stand along the line A he slides his right hand up the rim R until he can grasp the handle, then swings it to the position C which will raise the semaphore 1 to the position c, and then he lifts the handle 29 as seen in Figure 4 so that the pawl 30 engages the proper tooth 32, and the weight of the semaphore and tension of the wire will hold the parts in this position. To another driver either in front or in rear, the two lamps appear in a horizontal line—to the former they are white so that he knows the machine in question is approaching and is about to turn to what will be to his right, but the driver in the rear sees red lamps and knows that the machine in question is receding and is about to turn in the direction which will be to his left. The operator will next turn the steering wheel W to the left so that the cam 48 swings the pin 41 out from the block 42 as seen in dotted lines in Figure 5, until finally the cam passes the pin and the latter snaps back into the position shown in full lines. Meanwhile the operator has turned to the left and soon he straightens out his course again. This necessitates turning of the hub to the right, and the cam passes back over the front end of the pin 41 to seek its normal position between the two pins. In so returning to place, the cam forces the pin 41 to slide straight to the rear, since it cannot swing rearward because it is now in contact with the block 42, and in such sliding, its rear end strikes the pawl 30 and disengages it from the tooth 32, so that the latch mechanism is automatically tripped. The weight of the handle 29 now causes it to fall, and immediately the weight of the semaphore causes it to drop to neutral, which swings the handle back to its neutral position A. Here the lights are automatically extinguished as above explained. Had the operator contemplated a turn to the right instead of the left, he would have swung the handle to the line D instead of C, and the action would have been just the same excepting that to make the turn he would have had to turn the hub H in the other direction, and it would have been the other pin 40 which would have tripped the latch mechanism as will be understood. Had the operator intended to slow down or stop, he would have swung the handle only to the position B, and neither pin is effective to trip the pawl when latched in this position. When the machine comes to a stop, it is well to leave exposed the proper signal which indicates that fact, and when the driver starts on again he can trip the latch mechanism with the tip of his finger, as indeed, is possible in any of its positions. It will be seen from Figure 3 that the handle 29 swings from neutral at a point about opposite the driver, through practically one-quarter of a circle around the right side of the rim R. This is preferred, but not necessary. Nor is it imperative that the positions herein described shall have the significance attributed to them or be arranged in the exact order given. These and the various details of construction may be left to the manufacturer. It is obvious that the device can be made and sold as an attachment, and applied to almost any of the well known forms of machines. The automatic trip mechanism and the automatic return of parts to neutral when tripped by hand or otherwise puts as little labor as possible on the operator so that his hands are free for other work. The signal can be used by day or night. I prefer to mount it on the edge of the wind-shield where it is both out of the way and out of danger of being injured, and in such position it can be seen by others approaching from in front or traveling behind, while in its neutral position it is out of the way and practically out of sight. The first cost is small, and the simplicity of parts renders repairs unlikely and upkeep trifling.

What is claimed is:

1. In a signal, the combination of an upright shaft mounted to oscillate in its bearings, a crank arm on the shaft, signal operating means connected with said shaft a bell-crank lever connected by a horizontal pivot with said shaft, its longer outer arm constituting a handle and its shorter arm standing upright and constituting a pawl, and a ratchet fixedly carried by the upper bearing and having teeth engaged by the pawl when the handle is raised, each tooth having its active face slightly dished, for the purpose set forth.

2. In an automobile signal, the combination with bearings adapted to be carried by the steering post, an upright shaft mounted therein, and signal operating means carried by said shaft, of a handle pivoted to the shaft to turn it when the handle is swung in a plane beneath the steering wheel, mechanism latching the handle when swung to a position to raise the semaphore and signal an intention of the driver, and means controlled by the turning of the steering wheel whereby said latch mechanism is tripped.

3. In an automobile signal, the combination with bearings adapted to be carried by the steering post, an upright shaft mounted therein, and having means adapted for connection with a semaphore for operation of the latter by turning of the shaft; of a handle pivoted to the shaft to turn it when the handle is swung in a plane beneath the steering wheel, mechanism latching the handle when swung to a position to raise the semaphore and signal an intention of the driver, pins for tripping said latch mechanism when they are moved longitudinally, and means on the hub of the steering wheel for so moving either pin by the resetting of said wheel after it has been moved to make a turn.

4. In a control for automobile signals, the combination with bearings adapted to be attached to the steering post, an upright shaft mounted therein, and connections leading from its lower end and adapted to be connected with a semaphore whereby the latter can be raised by turning of the shaft; of a plate fast on the upper bearing and having ratchet teeth disposed in an arc around the projected axis of the shaft, the teeth having slightly dished active faces, a block fast on the shaft adjacent said plate, a pawl pivoted in the block and rising past said plate, and a handle projecting rigidly from the pawl outward beneath the steering wheel to a point within reach of the operator's fingers when his hand is on the rim.

5. In a control for automobile signals, the combination with bearings adapted to be attached to the steering post, an upright shaft mounted therein, and connections leading from its lower end and adapted to be connected with a semaphore whereby the latter can be raised by turning of the shaft; of a plate fast on the upper bearing and having ratchet teeth disposed in an arc around the projected axis of the shaft, a block fast on the shaft adjacent said plate, a pawl pivoted in the block and rising past said plate, a handle projecting rigidly from the pawl outward beneath the steering wheel to a point within reach of the operator's fingers when his hand is on the rim, pins slidably mounted on said plate with their outer ends alined with those teeth corresponding to the positions of the semaphore indicating a contemplated turn to either side, and means adapted to be carried by the hub of the steering wheel for passing said pins when moving from between their inner ends or sliding either pin when moving in a reverse direction, for the purpose set forth.

6. In a control for automobile signals, the combination with bearings adapted to be attached to the steering post, an upright shaft mounted therein, and connections leading from its lower end and adapted to be connected with a semaphore whereby the latter can be raised by turning of the shaft; of a plate fast on the upper bearing and having ratchet teeth disposed in an arc around the projected axis of the shaft, a block fast on the shaft adjacent said plate, a pawl pivoted in the block and rising past said plate, a handle projecting rigidly from the pawl outward beneath the steering wheel to a point within reach of the operator's fingers when his hand is on the rim, blocks mounted on said plate and channeled on their outer sides, pins mounted in said channels with their inner ends alined with those teeth corresponding to the positions of the semaphore indicating a contemplated turn to either side, yielding means drawing the pins normally into the channels, and a cam adapted to be mounted on the hub of the steering wheel to stand between the outer ends of the pins when the machine is on a substantially straight course whereby movement of the wheel to effect a turn will cause the cam to swing a pin aside and movement to restore the wheel to its normal position will cause the cam to slide said pin and disengage the pawl from the ratchet.

7. The herein described trip mechanism, the same comprising the combination with an element to be moved from one of two locking positions; of a guide having channeled sides, pins yieldably held in said channels and with their inner ends opposite said positions, and a cam disposed normally between their outer ends and movable to one side or the other according to the position of said element, its outward movement swinging the pin forward of said element and its return movement to normal position sliding said pin and tripping said element.

In testimony whereof, I affix my signature, in the presence of two witnesses.

TROWBRIDGE H. BUMSTEAD.

Witnesses:
  W. L. McKEE,
  LUCILE P. MAJORS.